US009708689B2

(12) United States Patent
Clark et al.

(10) Patent No.: US 9,708,689 B2
(45) Date of Patent: Jul. 18, 2017

(54) ISOTOPE DISPLACEMENT REFINING PROCESS FOR PRODUCING LOW ALPHA MATERIALS

(71) Applicant: Honeywell International Inc., Morristown, NJ (US)

(72) Inventors: Brett M. Clark, Spokane Valley, WA (US); Derek E. Grove, Spokane, WA (US); Kevin R. Terhaar, Spokane Valley, WA (US)

(73) Assignee: Honeywell International Inc., Morris Plains, NJ (US)

( * ) Notice: Subject to any disclaimer, the term of this patent is extended or adjusted under 35 U.S.C. 154(b) by 424 days.

(21) Appl. No.: 14/751,264

(22) Filed: Jun. 26, 2015

(65) Prior Publication Data
US 2016/0298208 A1    Oct. 13, 2016

Related U.S. Application Data

(60) Provisional application No. 62/144,763, filed on Apr. 8, 2015.

(51) Int. Cl.
   *C22B 9/04*   (2006.01)
   *C22B 9/10*   (2006.01)
   (Continued)

(52) U.S. Cl.
   CPC ............... *C22B 9/10* (2013.01); *C22B 9/04* (2013.01); *C22B 11/00* (2013.01); *C22B 13/06* (2013.01);
   (Continued)

(58) Field of Classification Search
   CPC ............... C22B 9/04; C22B 9/10; C25C 3/00
   See application file for complete search history.

(56) References Cited

U.S. PATENT DOCUMENTS

| 4,410,361 A | 10/1983 | Mehta et al. |
| 4,915,802 A | 4/1990 | Dunlop et al. |
(Continued)

FOREIGN PATENT DOCUMENTS

| JP | H11080852 A | * 3/1999 |
| JP | 2000084693 A | 3/2000 |

OTHER PUBLICATIONS

Machine Translation of Oomura et al. JP H11080852-A published Mar. 1999.*

(Continued)

*Primary Examiner* — George Wyszomierski
*Assistant Examiner* — Tima M McGuthry Banks
(74) *Attorney, Agent, or Firm* — Faegre Baker Daniels LLP

(57) ABSTRACT

A method for removing lead-210 ($^{210}Pb$) from a metal, the method comprising determining a $^{210}Pb$ concentration in a metal to be refined; determining an amount of low alpha lead to be added to the metal to be refined from the $^{210}Pb$ concentration, the low alpha lead having a $^{210}Pb$ concentration below that of the metal to be refined; forming a doped metal mixture by adding the low alpha lead to the metal to be refined; refining the doped metal mixture to separate at least a portion of the lead in the doped metal mixture to form a refined metal having a $^{210}Pb$ concentration lower than that of the metal to be refined.

20 Claims, 3 Drawing Sheets

Figure 1:
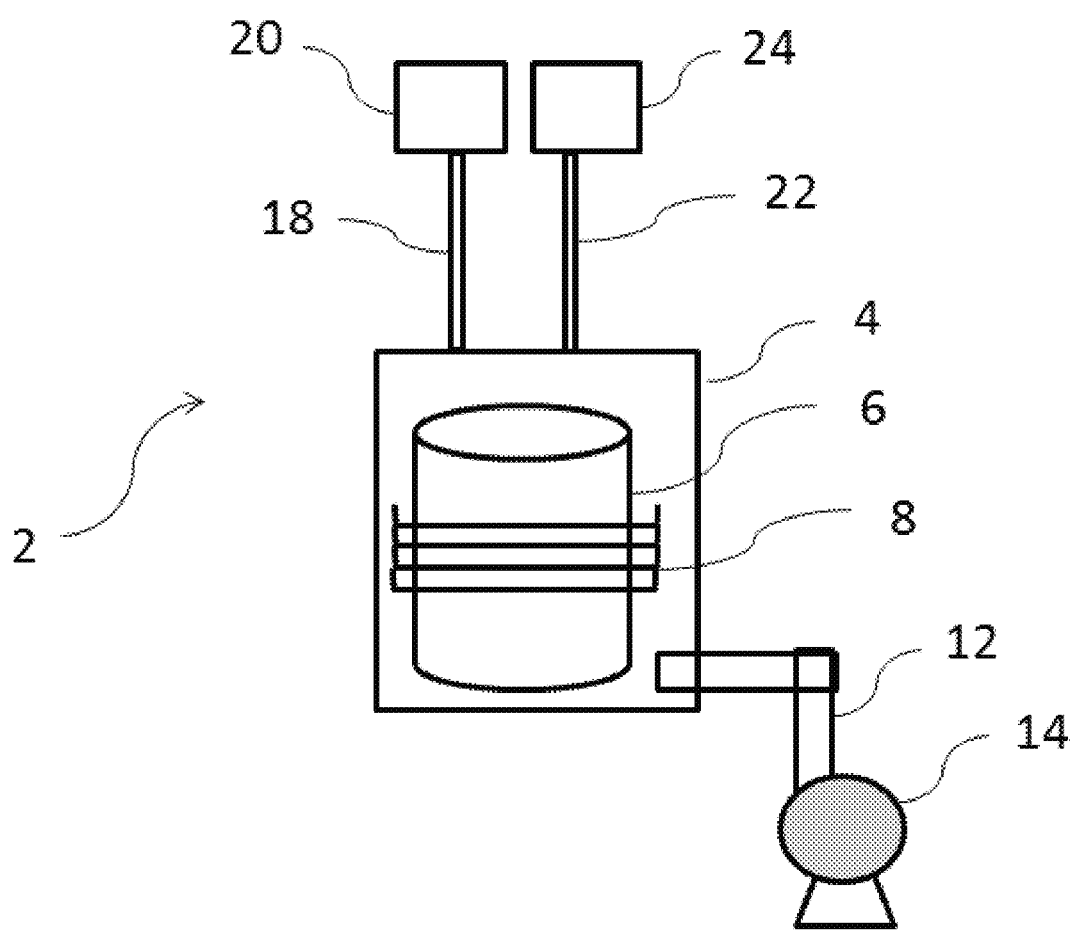

(51) Int. Cl.

| | |
|---|---|
| *C25C 3/00* | (2006.01) |
| *C22B 25/08* | (2006.01) |
| *C22B 13/06* | (2006.01) |
| *C22B 15/00* | (2006.01) |
| *C22B 21/06* | (2006.01) |
| *C22B 30/06* | (2006.01) |
| *C22B 11/00* | (2006.01) |
| *C22B 58/00* | (2006.01) |
| *C22B 30/02* | (2006.01) |
| *C22B 61/00* | (2006.01) |
| *C22B 19/32* | (2006.01) |
| *C22B 23/06* | (2006.01) |

(52) U.S. Cl.
CPC .............. *C22B 15/00* (2013.01); *C22B 19/32* (2013.01); *C22B 21/06* (2013.01); *C22B 23/06* (2013.01); *C22B 25/08* (2013.01); *C22B 30/02* (2013.01); *C22B 30/06* (2013.01); *C22B 58/00* (2013.01); *C22B 61/00* (2013.01); *C25C 3/00* (2013.01)

(56) References Cited

U.S. PATENT DOCUMENTS

| | | |
|---|---|---|
| 5,523,597 A | 6/1996 | Baumann et al. |
| 7,521,286 B2 | 4/2009 | Weiser et al. |
| 8,993,978 B2 | 3/2015 | Clark |
| 9,163,301 B2* | 10/2015 | Jung .................. C22B 9/04 |
| 9,340,850 B2* | 5/2016 | Shindo ............... C22B 25/08 |
| 2004/0065954 A1 | 4/2004 | Weiser et al. |
| 2010/0132508 A1 | 6/2010 | Pizzuto et al. |
| 2012/0298586 A1 | 11/2012 | Grandbois et al. |
| 2013/0341196 A1 | 12/2013 | Silinger et al. |
| 2014/0060252 A1 | 3/2014 | Jung et al. |
| 2014/0131219 A1 | 5/2014 | Fassbender et al. |

OTHER PUBLICATIONS

The International Search Report mailed Jul. 14, 2016 in International Application No. PCT/US2016/025138.

Scheibner et al. "Laser Isotope Purification of Lead for Use in Semiconductor Chip Interconnects," Lawrence Livermore National Laboratory, 1996 Electronic Components and Technology Conference, 4 pages.

\* cited by examiner

ISOTOPE DISPLACEMENT REFINING PROCESS FOR PRODUCING LOW ALPHA MATERIALS

CROSS REFERENCE TO RELATED APPLICATION

This application claims priority to U.S. Provisional Patent Application Ser. No. 62/144,763, entitled "ISOTOPE DISPLACEMENT REFINING PROCESS FOR PRODUCING LOW ALPHA MATERIALS," filed Apr. 8, 2015, the entire disclosure of which is expressly incorporated herein by reference.

TECHNICAL FIELD

The present invention relates to processes for refining metals and metal materials. More particularly, the present invention relates to a process for removing alpha emitting radioisotopes from a metal or metal material.

BACKGROUND

Metal materials, such as pure metals and metal alloys, for example, are typically used as solders in many electronic device packaging and other electronic manufacturing applications. The emission of alpha particles from certain isotopes may lead to single-event upsets ("SEUs"), often referred to as soft errors or soft error upsets. Alpha particle emission (also referred to as alpha flux) can cause damage to packaged electronic devices, and more particularly, can cause soft error upsets and even electronic device failure in certain cases. Concerns regarding potential alpha particle emission heighten as electronic device sizes are reduced and alpha particle emitting materials are located in closer proximity to potentially sensitive locations.

Uranium and thorium are well known as principal radioactive elements often present in metal materials which may radioactively decay according to known decay chains to form alpha particle emitting isotopes. Of particular concern in non-lead materials is the presence of polonium-210 ($^{210}Po$), which is considered to be the primary alpha particle emitter responsible for soft error upsets. Lead-210 ($^{210}Pb$) is a decay daughter of uranium-238 ($^{238}U$), has a half-life of 22.3 years, and β-decays to bismuth-210 ($^{210}Bi$). However, due to the very short 5.01 day half-life of $^{210}Bi$, such isotope is essentially a transient intermediary which rapidly decays to $^{210}Po$. The $^{210}Po$ has a 138.4 day half-life and decays to the stable lead-206 ($^{206}Pb$) by emission of a 5.304 MeV alpha particle. It is the latter step of the $^{210}Pb$ decay chain, namely, the decay of $^{210}Po$ to $^{206}Pb$ with release of an alpha particle that is of most concern in metal materials used in electronic device applications.

The root cause of alpha emission in refined, high purity metals and alloys is $^{210}Pb$ at concentrations that may be lower than parts per trillion (ppt), for example, remaining after processing. Current refinement processes have focused on removing bulk Pb to below 1 part per million (ppm) and with it a proportional fraction of $^{210}Pb$. However, if the $^{210}Pb$ concentration is high enough, current refining processes will not remove it to low enough levels, even after multiple refinement passes.

Although $^{210}Po$ and/or $^{210}Pb$ may be at least in part removed by melting and/or refining techniques, such isotopes may remain as impurities in a metal material even after melting or refining. Removal of $^{210}Po$ from a metal material results in a temporary decrease in alpha particle emissions from the metal material. However, it has been observed that alpha particle emissions, though initially lowered, will typically increase over time to potentially unacceptable levels as the secular equilibrium of the $^{210}Pb$ decay profile is gradually restored based on any $^{210}Pb$ remaining in the metal material. As used herein, the term "secular equilibrium" refers to a condition in which the quantity or concentration of a radioactive isotope within a material remains constant because its production rate is equal to its decay rate. For example, the concentration of a radionuclide B in a given sample is at secular equilibrium when the production rate of radionuclide B from the decay of a parent radionuclide A, is the same as the decay rate of radionuclide B into its daughter radionuclide C.

SUMMARY

The present disclosure provides a method for removing lead-210 ($^{210}Pb$) from a metal comprising determining a $^{210}Pb$ concentration in a metal to be refined, determining an amount of low alpha lead to be added to the metal to be refined from the $^{210}Pb$ concentration, forming a doped metal mixture by adding the low alpha lead to the metal to be refined; refining the doped metal mixture to separate at least a portion of the lead from the doped metal mixture to form a refined metal having a $^{210}Pb$ concentration lower than that of the metal to be refined.

The present disclosure provides a method for removal of alpha particle emitters from a metal material having a first alpha emissions count, the method comprising adding a lead material to the metal material, the lead material having a second alpha emissions count, the second alpha emissions count is lower than the first alpha emissions count; refining the metal material to remove at least a portion of the lead with a refining process, wherein the refining process has selectivity of the metal material over lead.

The present disclosure provides a method of removing lead from a metal material, comprising determining a concentration of a first lead isotope in a metal material to be refined, the metal material to be refined including the first lead isotope and a target metal; adding a lead material that is substantially free of the first lead isotope to the metal material to form a doped metal mixture; and removing at least a portion of the first lead isotope and the lead material from the doped metal mixture to form a refined target metal.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 1 is a block diagram of an example vacuum distillation refining system.

FIG. 2 is a block diagram of an example electrorefining system.

FIG. 3 is a plot of alpha particle emissions for electrorefined tin samples.

DETAILED DESCRIPTION

A method for removing alpha particle emitters from a metal material is described herein. The method described may be used to produce a refined metal material having reduced alpha particle emissions or alpha flux when measured after the refining process. Alpha particle emissions do not necessarily remain stable after the material has been subjected to a refining process, and alpha particle emissions may increase or decrease over time. As described herein, the refined material may also have reduced alpha particle emissions when measured a period of time following the refining process, such as 90 days or 800 days after the refining process.

Suitable metals or metal materials may include materials of the kind typically used in the manufacture of electronic components, such as metal materials used for solders, for example. The metal material may be itself a single or substantially pure elemental material, including tin, lead, copper, aluminum, bismuth, silver, indium, antimony, selenium, gallium, thallium, zinc, and nickel, for example, or may be an alloy or combination of any two or more of the foregoing materials or an alloy of any one or more of the foregoing materials with one or more other elements.

As used herein, the term "target material" refers to the material that is principally sought as a final product from the refining process. For example, to a user desiring to obtain tin with a lower concentration of alpha particle emitters, tin is the target material.

The present method is principally described herein with reference to tin as the target metal material, and with reference to the lead-210 isotope ($^{210}$Pb) decay chain by which 210Po is the primary alpha particle emitter. However, the present method may also be used in connection with reducing alpha particle emissions in other target metal materials, and/or may also be used to remove one or more isotopes other than $^{210}$Pb. This method may be referred to as an isotope displacement refining process. For example, the isotope displacement refining process may be used to remove a radioactive first isotope of a given metal from a metal mixture and replace the radioactive first isotope with any of a number of other stable isotopes of the same metal.

As described herein, low alpha Pb refers to lead that is substantially free of isotope $^{210}$Pb. That is, low alpha Pb refers to lead that lacks any significant amount of $^{210}$Pb, and is substantially comprised of the four stable isotopes $^{204}$Pb, $^{206}$Pb, $^{207}$Pb, and $^{208}$Pb. As used herein, the term "lead" refers to lead comprised of all isotopes including $^{210}$Pb. As used herein, "substantially free" in the context of "low alpha lead" refers to a $^{210}$Pb concentration below 10 ppm, 5 ppm, 1 ppm, 0.1 ppt, 0.01 ppt, or 0.001 ppt.

As described herein, doping a metal material prior to or during the refining process with lead having a $^{210}$Pb concentration lower than that of the metal material may result in a refined target material having reduced alpha particle emissions. For example, doping a metal material with low alpha Pb prior to or during the refining process may result in a refined target material having reduced alpha particle emissions.

Following doping, the resulting doped metal mixture containing the metal material to be refined and the low alpha Pb may be subjected to a refining process to separate the lead from the target material. Suitable refining processes include refining processes that have a selectivity difference between lead and the target material. Example refining processes include vacuum distillation, electrorefining, and zone refining. For example, a separation process such as vacuum distillation may be used to separate a target material from lead on the basis of differential vapor pressures. In another example, electrorefining may be used to separate lead from the target material on the basis of different electrode potentials between lead and the target material. In another example, zone refining may be used to separate lead from the target material on the basis of greater solubility of the lead in the liquid versus solid phase of the material to be purified.

The refining process removes lead, and may produce a target material containing only nominal levels of lead. For example, the refining process may decrease the lead concentration in the target material to less than 10 ppm, less than 5 ppm, or less than 1 ppm. The refining process does not distinguish between lead isotopes. That is, the refining process removes lead irrespective of whether it is isotope $^{204}$Pb, $^{206}$Pb, $^{207}$Pb, $^{208}$Pb, or $^{210}$Pb. The refining efficiency $\epsilon$ for removing Pb from a material to be purified is given by equation (1):

$$\varepsilon = \frac{Pb_{out}}{Pb_{in}} = \frac{Pb_{out}^{210}}{Pb_{in}^{210}} \quad (1)$$

wherein:
$Pb_{out}$ is the total amount of lead remaining in the target material after refining,
$Pb_{in}$ is the total amount of lead in the material to be refined,
$^{210}Pb_{out}$ is the amount of $^{210}$Pb in the target material after refining, and
$^{210}Pb_{in}$ is the amount of $^{210}$Pb in the material to be refined.

For refining processes where the material to be purified undergoes a separation step to remove lead, the $^{210}$Pb reduction scales as Pb reduction according to equation (2):

$$Pb_{out}^{210} = \frac{Pb_{out}}{Pb_{in}} = Pb_{in}^{210} \quad (2)$$

Because the refining process does not distinguish between lead isotopes, it will remove $^{210}$Pb in the same proportion as it removes stable Pb isotopes as described in equation (1). Further, because the refining process lowers the overall lead concentration in the target material, diluting the $^{210}$Pb in the material to be refined with low alpha Pb, followed by separating the lead from the target material will remove a portion of the $^{210}$Pb from the material to be refined. Stated another way, the relative amount of $^{210}$Pb in the material to be refined is first lowered by adding low alpha Pb to the material to be refined. When the target material is then separated from the lead, the removed lead will contain a portion of the $^{210}$Pb that was in the material to be refined. After the refining process, any lead remaining in the target material will have a reduced amount of $^{210}$Pb than it had before the refining process according to equation (3):

$$Pb_{out}^{210} = Pb_{out} \frac{Pb_{in}^{210} + Pb_{add}^{210}}{Pb_{in} + Pb_{add}} \quad (3)$$

wherein:
$Pb_{add}$ is the amount of low alpha Pb added to dilute $^{210}$Pb, and
$^{210}Pb_{add}$ is the amount of $^{210}$Pb in the low alpha Pb added.

In one example, the amount of $^{210}$Pb contributed from the low alpha Pb ($^{210}Pb_{add}$) is substantially zero. For example, the amount of $^{210}$Pb in the low alpha Pb is less than 0.1 ppt, less than 0.01 ppt, or less than 0.001 ppt, and the $^{210}$Pb reduction achieved is directly proportional to the amount of low alpha Pb added. The refined target material will contain less $^{210}$Pb relative to a process where no low alpha Pb is added before the refining process. The refined target material may still contain lead, but the overall $^{210}$Pb content will be lower than in the starting material to be purified.

In some embodiments, the factor by which the $^{210}$Pb is removed from the target material is proportional to the amount of low alpha Pb added to the material to be refined. For example, adding a greater amount of low alpha Pb may produce a refined target material having lower alpha particle emissions (i.e., a greater amount of $^{210}$Pb is removed from the refined target material). In some embodiments, the $^{210}$Pb reduction is limited only by the amount of low alpha Pb that can be added.

With this relationship in mind, the amount of low alpha Pb necessary to attain a desired alpha flux of the refined material can be determined. Knowing the $^{210}$Pb concentration in a starting material to be refined and the desired concentration of $^{210}$Pb in a target material, a user may calculate the amount of low alpha Pb that must be added to the material to be refined using equation (4).

$$Pb_{add} = Pb_{out} \frac{(Pb^{210}_{in} + Pb^{210}_{add})}{Pb^{210}_{out}} - Pb_{in} \quad (4)$$

The amount of lead in the starting material to be refined, i.e. $Pb_{in}$, may be determined using any commonly available detection technique such as atomic emission spectroscopy or glow discharge mass spectrometry. The amount of lead removed by the process, i.e. $Pb_{out}$, in some embodiments may be determined by the known final concentration of lead achievable with the separation method used. For example, depending on the refining process that is used, the concentration of a lead in the target material that can be achieved may be limited. For example, in vacuum distillation refining, the lowest concentration of lead that can be achieved may be approximately, 10 ppm, 5 ppm, or 1 ppm. Thus, the target material purity level may be set depending on the refining method chosen.

The amount of $^{210}$Pb in the material to be refined, i.e., $^{210}Pb_{in}$, and the amount of $^{210}$Pb in the target material, i.e. $^{210}Pb_{out}$, may be determined by first measuring the alpha particle emissions. A method for determining the concentration of $^{210}$Pb in a given material is disclosed herein and contained within U.S. Pat. No. 8,993,978 titled "Method for Assessing an Alpha Particle Emission Potential of a Metallic Material," which is hereby incorporated by reference.

According to this method, the alpha particle emissions attributable to $^{210}$Po are expressed as polonium alpha activity, $A_{Po}$, at a time (t) following a secular equilibrium disruption process. From the $A_{Po}$ and elapsed time (t), the concentration of $^{210}$Pb atoms in the sample can be calculated using equation (5):

$$[^{210}Pb]_0 = \frac{\lambda_{Po} - \lambda_{Pb}}{\lambda_{Po}\lambda_{Pb}(e^{-\lambda_{Pb}t} - e^{-\lambda_{Po}t})}(A_{Po}(t) + A_{Po}(t_0)e^{-\lambda_{Po}t}) \quad (5)$$

wherein:
$\lambda_{Po}$=ln2/138.4 days, based on the half-life of $^{210}$Po;
$\lambda_{Pb}$=ln2/22.3 years (8,145.25 days) based on the half-life of $^{210}$Pb;
A is the alpha particle emission measured in counts/hr; and time (t) is the time which has elapsed between the secular equilibrium disruption process and the alpha particle emission measurement.

The method may be used to measure the alpha particle emission in a metal material after the metal material is subjected to a secular equilibrium disruption process. As used herein, the term "secular equilibrium disruption process" refers to a process to which the metal material is subjected which at least partially disrupts the secular equilibrium of the decay profile of at least one target parent isotope within the metal material. In most instances, the secular equilibrium disruption process disrupts the secular equilibrium of the decay profile of a target parent isotope by reducing the concentration of the target parent isotope in the metal material, by reducing the concentration of a corresponding target decay isotope in the metal material, or by a combination of the foregoing. Exemplary secular equilibrium disruption processes include melting, casting, smelting, refining, or any combination of two or more of the foregoing processes. Exemplary refining processes include electro- or electro-chemical refining, chemical refining, zone refining, and vacuum distillation. Typically, in the secular equilibrium disruption process, and particularly when the secular equilibrium disruption process is at least in part a refining process, both the target parent isotopes and the target decay isotopes are at least partially removed as impurities or contaminant components by physical and/or chemical separation from the bulk metal material.

In some embodiments, the secular equilibrium disruption process may remove substantially all of a given target decay isotope and thereby effectively "reset" the secular equilibrium of the corresponding target parent isotope. For example, in the case of a metal material including $^{210}$Pb as a target parent isotope, the secular equilibrium disruption process may substantially completely remove all of the $^{210}$Po target decay isotope in the material, such that the secular equilibrium of $^{210}$Pb is effectively reset, wherein substantially all $^{210}$Po that is present in the material following the secular equilibrium disruption process is generated by decay of $^{210}$Pb after the said disruption process. However, the present process may also be practiced using secular equilibrium disruption processes that remove only a portion of the target parent isotope and/or target decay isotope, and the present process is not limited to secular equilibrium disruption processes that remove substantially all of a given target decay isotope.

After the metal material is subjected to the secular equilibrium disruption process, the alpha particle emission of the metal material is detected, i.e., an alpha particle emission measurement is obtained. Although it is within the scope of the present disclosure to obtain an alpha particle emission of the entire metal material in bulk form, typically a sample of the bulk metal material will be obtained for purposes of alpha particle emission analysis.

A relatively thin portion of the bulk metal material may be obtained as a sample by a suitable method such as rolling the bulk metal material to provide a thin sheet of sample material, or by any other another suitable method.

After the sample is obtained, the sample is treated by heat in order to promote diffusion of target decay isotopes in the sample material until such point that the concentration of atoms of the target decay isotopes in the sample is uniform throughout the sample volume. In many samples, there may be a larger concentration of atoms of target decay isotopes toward the center of the sample, for example, or otherwise in other areas of the sample such that a concentration mismatch or gradient is present. The heat treatment removes any such concentration mismatches or gradients by promoting diffusion of atoms of target decay isotopes within the sample from areas of relatively higher concentration toward areas of relatively lower concentration such that a uniform concentration of target decay isotopes is obtained within and throughout the sample. When such uniform concentration is obtained, the number of atoms of target decay isotopes within a detection limit depth of the alpha particle detection process will be representative of and, more particularly, will correlate directly to, the uniform concentration of atoms of target decay isotopes throughout the entirety of the sample. Such uniform concentration is achieved when the chemical potential gradient of the target decay isotopes is substantially zero and the concentration of the target decay isotopes is substantially uniform throughout the sample.

Stated in another way, at room temperature, the test sample may have a chemical potential gradient, in that the concentration of target decay isotopes is higher on one side of the sample than another side of the sample, or at the centroid of the sample than at the outer surfaces of the sample. Heating of the sample adjusts the chemical potential gradient and, at a sufficient time and temperature exposure, the chemical potential gradient is substantially zero and the concentration of the target decay isotopes is substantially uniform throughout the sample.

As used herein, the term "detection limit depth" refers to a distance within a given metal material through which an emitted alpha particle may penetrate in order to reach a surface of the material and thereby be released from the material for analytical detection. Detection limit depths for $^{210}$Po in selected metal materials are provided in Table 1 below, in microns, which is based on the penetration of the 5.304 MeV alpha particle released upon decay of $^{210}$Po to $^{206}$Pb:

TABLE 1

Detection limit depths of $^{210}$Po in selected metal materials

| Metal material | Detection limit depth of $^{210}$Po (microns) |
|---|---|
| Tin (Sn) | 16.5 |
| Aluminum (Al) | 23.3 |
| Copper (Cu) | 11 |
| Bismuth (Bi) | 17.1 |

The detection limit depth for alpha particles of differing energy, such as alpha particles emitted upon radioactive decay of alpha particle-emitting isotopes other than $^{210}$Po, will vary, with the detection limit depth generally proportional to the energy of the alpha particle. In the present method, emitted alpha particles may be detected by use of a gas flow counter such as an XIA 1800-UltraLo gas ionization chamber available from XIA L.L.C. of Hayward, Calif. according to the method described by JEDEC standard JESD 221.

Target decay isotopes such as $^{210}$Po are known to diffuse or migrate within metal materials and, in this respect, the heat treatment of the present method is used to promote diffusion of the target decay isotope within the material sample to eliminate concentration gradients. In particular, target decay isotopes, such as $^{210}$Po, will have a diffusion rate J in a given metal material, which can be expressed according to equation (6) below:

$$J = -D\frac{\partial \phi_{Po}}{\partial x} \quad (6)$$

wherein: $\partial\Phi/\partial x$ is the concentration gradient of the target decay isotope, such as $^{210}$Po, and D is the diffusion coefficient.

The concentration gradient of the target decay isotope is determined by measuring the alpha particle emissions at the surface of a sample, removing a layer of material of x thickness, such as by chemical etching, and measuring the alpha particle emissions at the x depth. The concentration of the target decay isotope at the original surface and at depth x is directly proportional to the alpha particle emission at each surface, and concentration gradient of the target decay isotope is calculated as the difference between the concentration at one of the surfaces and the concentration at depth x over the distance x.

To determine the polonium diffusion rate J, the polonium alpha particle emissions from 5-5.5 MeV in a tin sample was measured. The sample was then heated at 200° C. for 6 hours, and the alpha particle emission measurement was repeated. The number of polonium atoms N is calculated from equation (7) below:

$$N = A/\lambda Po \quad (7)$$

wherein:
A is the alpha particle emission measured in counts/hr; and
$\lambda$Po=ln2/138.4 days, based on the half-life of $^{210}$Po.

The number of moles of polonium was calculated by dividing the number of polonium atoms N by Avogadro's number. Dividing the difference in the number of moles of polonium by the sample area (0.1800 m2) and the time over which the sample was heated (6 hours) yields a lower bound on the diffusion rate of $4.5 \times 10^{-23}$ mol·m-2·-1 at 473K in tin.

TABLE 2

Data for diffusion rate determination

| Measurement | A (Counts/Hr) | N (atoms) | Moles |
|---|---|---|---|
| Initial | 24.75 | 1.19E+05 | 1.97E−19 |
| Final | 46.71 | 2.24E+05 | 3.72E−19 |

Based on equation (6), one may determine a suitable time and temperature heating profile to which the sample may be exposed in order to diffuse the target decay isotope within the sample sufficiently to eliminate any concentration gradients, such that detection of alpha particle emissions within the detection limit depth of the sample is representative, and directly correlates, to the concentration of the target decay isotope throughout the sample. For example, for a tin sample having a thickness of 1 millimeter, a heat treatment of 200° C. for 6 hours will ensure that any concentration gradients of $^{210}$Po atoms within the sample are eliminated.

Thus, for a given metal material and sample size, the application of heat may be selected and controlled by time and temperature exposure of the sample to ensure that atoms of a target decay isotope are diffused to a sufficient extent to eliminate concentration gradients. It has been found that, by the present method, in providing a suitable time and temperature profile for the heat treatment step, measurement of alpha particle emissions from a target decay isotope present within the detection limit depth directly corresponds to the concentration or number of target decay isotope atoms within the entirety of the sample.

It is generally known that subjecting a metal material to heat promotes diffusion of elements within the material. However, prior methods have employed heat treatment simply to increase the number of alpha particle emissions detected over background levels to thereby increase the signal to noise ratio of the alpha particle emission detection.

Due to the fact that $^{210}$Pb has a 22.3 year half-life, the $^{210}$Pb concentration is substantially constant over the time (t) when the time (t) is less than three years, particularly where the alpha particle emission measurement occurs relatively soon after the secular equilibrium disruption process. Also, when substantially all of the $^{210}$Po is removed in the secular equilibrium disruption process (which may be the case when the secular equilibrium disruption process is a strenuous refining process, for example) the last term in equation (5) above is very near to zero because the initial $^{210}$Po concentration will be very near to zero when the alpha particle emissions are measured relatively soon after the secular equilibrium disruption.

The concentration of the target parent isotope may be calculated by the above-equation (5) and, once the concentration of the target parent isotope is calculated, the known half-life of the target parent isotope may be used to provide an assessment or prediction of a maximum concentration of the target decay isotope within the material based on the re-establishment of the secular equilibrium profile of the target parent isotope. Thus, using this measurement method, the concentration of $^{210}$Pb, i.e. $^{210}$Pb$_{in}$, in the material to be refined may be determined.

Using the same equation, a user may also determine what concentration of $^{210}$Pb in the target material is acceptable, and thus how much $^{210}$Pb must be removed from the material to be refined, which correlates to $^{210}$Pb$_{out}$.

In other words, once the concentration of $^{210}$Pb atoms is determined using equation (5), based on the half-life of $^{210}$Pb the maximum $^{210}$Po activity at re-establishment of secular equilibrium will occur at (t)=828 days, and is calculated from equation (8) below:

$$[^{210}Pb]_0 = \frac{\lambda_{Po} - \lambda_{Pb}}{\lambda_{Po}\lambda_{Pb}(e^{-\lambda_{Pb}t} - e^{-\lambda_{Po}t})}(A_{Po}(t) + A_{Po}(t_0)e^{-\lambda_{Po}t}) \quad (8)$$

Consistent time units (i.e., days or years) should be used across equation (5) and equation (8).

The maximum $^{210}$Po activity directly correlates to a maximum alpha particle emission of the material, and will occur at 828 days from the secular equilibrium disruption process. In this manner, due to the fact that the present measuring method will typically be carried out on the refined metal material relatively soon after the secular equilibrium disruption process, the calculated maximum concentration of the target decay isotope and concomitant alpha particle emission will typically be a maximum future concentration of the target decay isotope and concomitant alpha particle emission that the metal material will exhibit over a timeframe which corresponds to the half-life of the target parent isotope.

For example, based on the half-life of $^{210}$Pb, the applicable timeframe or "window" by which a maximum possible concentration of $^{210}$Po (and thereby a peak in alpha particle emissions) will be reached in the material will occur at 828 days (27 months) from the secular equilibrium disruption process.

It is also possible to calculate a possible concentration of $^{210}$Po (and thereby the alpha particle emissions) at any specified elapsed time from the secular equilibrium disruption process. In this manner, it is possible to calculate a possible concentration of $^{210}$Po after a sufficient elapsed time from the secular equilibrium disruption process, where the sufficient elapsed time may be at least 200, 250, 300, 350 or 365 days from the secular equilibrium disruption process. For example, based on the half-life of $^{210}$Pb, the applicable timeframe by which the $^{210}$Po concentration will reach 67% of the maximum possible concentration in the material will occur at 200 days from the secular equilibrium disruption process. Similarly, the $^{210}$Po concentration will reach 80% and 88% of the maximum possible concentration in the material at 300 days and 365 days, respectively, from the secular equilibrium disruption process.

Advantageously, according to the measuring method described above, after a metal material has been subjected to a secular equilibrium disruption process such as by refining the metal material, a maximum alpha particle emission that the metal material will reach during the useful life of the material may be accurately predicted. In this manner, this measuring method provides a valuable prediction of the maximum alpha particle emission for metal materials, such as solders, that are incorporated into electronic devices.

Returning now to the refining method; knowing what concentration of alpha emitting particles is acceptable in the target material, a user may use equation (8) to determine the maximum alpha particle emissions at a time (t) following secular equilibrium and thus determine how much $^{210}$Pb must be removed from the material to be refined, i.e., $^{210}$Pb$_{out}$, to achieve an acceptable alpha particle emission. In some embodiments, the final lead concentration in the target material, i.e. Pb$_{out}$, may be set by the refining process that is used. For example, in certain separation processes, the lowest concentration of lead in the target material that can be achieved is limited. For example, in vacuum distillation refining, the lowest concentration that can be achieved may be approximately, 10 ppm, 5 ppm, or 1 ppm. Thus the target material purity level may be set by the refining method chosen. Once the concentration of $^{210}$Pb in the starting material to be refined and the concentration of $^{210}$Pb in the target material are known, all quantities in equation (5) are known and a user may determine how much low alpha Pb must be added to the material to be refined.

Since the entire isotope displacement refining process may be repeated any number of times, and since each time the entire process is run the $^{210}$Pb content is proportionally reduced, there is no process limit on the purity level of the target material that may be attained with this method. Stated another way, since the amount of $^{210}$Pb removed by the isotope displacement refining process is a percentage of the amount of $^{210}$Pb in the material before the process is run, a user may repeatedly subject a material to be refined to this process and thus stepwise reduce the concentration of $^{210}$Pb. Additionally or alternatively, the metal material may be subjected to one or more additional refining processes either before or after the isotope displacement refining process in order to remove additional impurities or trace elements from the material. For example, a tin material may be subjected to an additional refining process for the removal of bismuth either before or after an isotope displacement refining process.

FIG. 1 is a block diagram of an example vacuum distillation apparatus 2, which includes a vacuum chamber 4 and a crucible 6 for containing a molten metal material, and which may be used for the separation of, for example, lead from tin. The crucible 6 may be constructed from any suitable material, such as graphite, that can withstand the temperatures required to melt metals or metal alloys. The crucible 6 may have a heat source 8 for maintaining the metal material within the crucible 6 in a molten state during the vacuum distillation. For example, the crucible 6 may have heating elements that may be in contact with the crucible 6.

A vacuum line 12 may also be fluidly connected to the vacuum chamber 4 for reducing the air pressure within vacuum chamber 4. In some embodiments, the vacuum line 12 may be connected to a vacuum pump 14 such that air may be withdrawn from the vacuum chamber 4 to create a vacuum within the chamber 4. In some embodiments, creating a vacuum within the chamber 4 may aid in the separation process by increasing the difference in the partial pressures of the components in the molten mixture. In one embodiment, the vacuum degree will be between 0.5 and 20 Pa within the chamber 4.

A first material removal line 18 may be fluidly connected to the vacuum chamber 4 for removing one or more separated materials from the vacuum chamber 4. For example, material removal line 18 may be configured to remove gas and/or liquid materials from the vacuum chamber 4. In one embodiment, removal line 18 may remove lead from the vacuum chamber 4. For example, removal line 18 may carry vaporized lead from the vacuum chamber 4 to a condenser 20 where the lead vapor may condense and be collected. In some embodiments, more than one material removal line 18 may be fluidly connected to chamber 4.

In some embodiments, a second material removal line 22 may be fluidly connected to the crucible 6 for removing material from the crucible 6. For example line 22 may remove liquid tin from the vacuum chamber 4. In some embodiments, the process may be a batch process. In an alternative embodiment, a continuous process may be used.

In some embodiments, a tin material to be refined is provided in a molten state. The tin material to be refined may have an unacceptable alpha flux. That is, the tin material to be refined may have an alpha particle emission above a desired value. Molten low alpha Pb may be added to the molten tin material, and the resulting tin and lead mixture (or doped tin mixture) may then be subjected to a vacuum distillation refining process to separate the tin from the lead. The vacuum distillation refining process does not distinguish between lead isotopes during separation of the tin and the lead. That is, the vacuum distillation refining process removes lead irrespective of whether the lead is isotope $^{204}$Pb, $^{206}$Pb, $^{207}$Pb, $^{208}$Pb, or $^{210}$Pb.

In some embodiments, homogeneous dispersion of the low alpha Pb throughout the tin material, such as by mixing both materials in a molten state, is necessary to achieve the optimum displacement of $^{210}$Pb. If the low alpha Pb is not homogeneously distributed along with the $^{210}$Pb in the matrix in such embodiments, the refining process may remove the low alpha Pb preferentially versus $^{210}$Pb in the material, resulting in reduced $^{210}$Pb displacement.

Vacuum distillation may be used for separating lead and tin because of the difference in vapor pressure of these two metals. The metal having the higher vapor pressure at a given temperature will be the first to evaporate from the mixture. That is, lead will be the first to evaporate from a mixture containing tin and lead. During the separation process, the evaporated lead can be removed or drawn off through removal line 18 and condensed. The tin remains in the crucible 6. The tin remaining after the lead is distilled out of the mixture may either be left in the vacuum chamber 2 to cool and solidify, or may be drawn out of the vacuum chamber 2 as a liquid. A typical temperature range for carrying out the vacuum distillation process may be between 800° C. and 1200° C.

Any lead remaining in the tin material will have a lower concentration of $^{210}$Pb isotope than the lead present in the starting material. More specifically, the percentage of $^{210}$Pb in the lead in the material to be refined will be reduced by adding low alpha Pb to the material to be refined. This is because the lead added to the material to be refined will be substantially free of $^{210}$Pb, thus the $^{210}$Pb in the material to be refined will be diluted. When the material to be refined is then separated from the lead it contains, the removed lead will contain a higher concentration of $^{210}$Pb than was in the lead added to the material to be refined. Thus a portion of the $^{210}$Pb that was originally in the material to be refined will be removed with the bulk lead removed in the refining process.

A remaining concentration of lead in tin after vacuum distillation may typically be between about 1-5 ppm. Since alpha particle emission is a function of the concentration of $^{210}$Pb in the refined material, lowering the $^{210}$Pb concentration in the target material will also lower the alpha emission. Thus, using the method disclosed herein, a target material may be produced having lowered alpha emissions than the starting material. For example, from a starting material of tin having an alpha emission of 0.01 cts/cm$^2$/hr a refined tin may be produced that has an alpha emission of 0.0020 cts/cm$^2$/hr.

Figure 2:
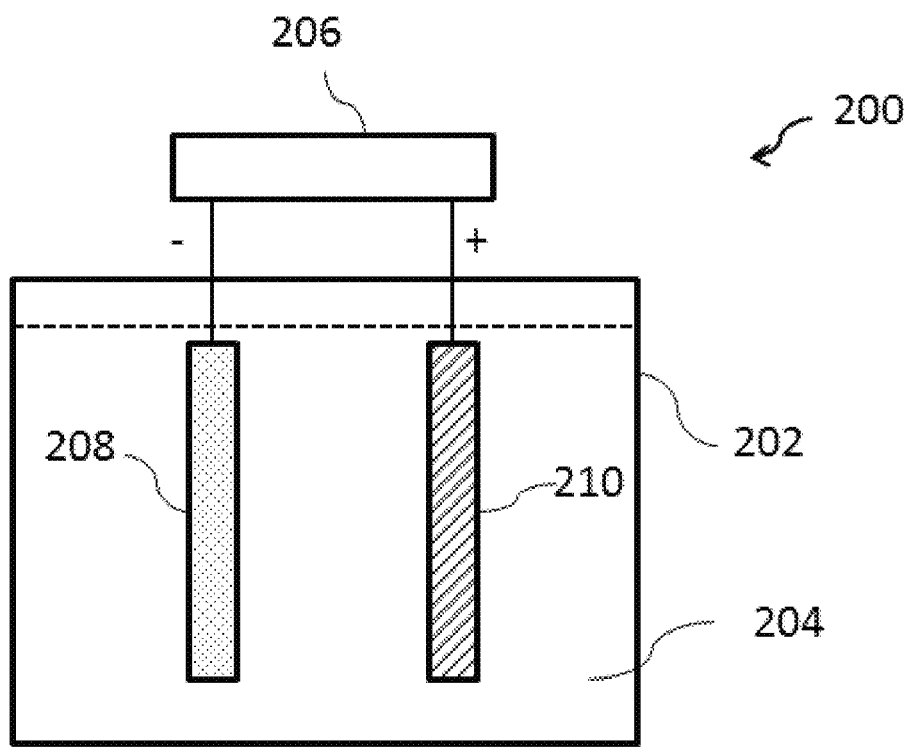

Another suitable refining process is electrorefining. FIG. 2 is a block diagram of an example electrorefining apparatus 200, which includes an electrorefining bath 202. The electrorefining bath 202 may contain an electrorefining solution 204 comprised of water and an acid such as nitric or sulfuric acid. A metal material to be refined may be dissolved in the electrorefining solution 204, forming metal ions of the material to be refined that include ions of a target metal material and a metal material impurity.

The electrorefining apparatus 200 may contain a cathode plate 208 and an anode plate 210 placed into the electrorefining solution 204. A voltage may be applied between the cathode plate 208 and the anode plate 210 by an electrode charging source 206 that may impart a negative charge on the cathode plate 208 and a positive charge on the anode plate 210. The electrode charging source 206 may be any component that can impart an electric charge such as a battery or a power supply. Because of an electric charge in metal ions within the electrorefining bath, the ions may preferentially deposit on the cathode plate 208 depending on the charge on each plate and the metal ion charge. For example, the charge on tin and lead ions may cause the ions to preferentially attract to the cathode plate 208 causing electrodeposition of one or both species of metal ions on the cathode plate 208. By maintaining the electrode charge on the cathode plate 208 and the anode plate 210 for a period of time, tin ions contained in the electrorefining solution 204 deposit onto the cathode plate 208 to form solid metal tin having a reduced alpha count. By this method, tin contained in the material to be refined may be removed from the material and captured in a substantially lead free form.

In some embodiments, adding greater amounts of low alpha Pb to a material to be refined will lead to lower $^{210}$Pb in the target material. In some embodiments, however, the electrorefining process may be limited. For example, in some embodiments, the holding capacity of the electrolyte solution may present an upper limit on the amount of lead that can be added to the material to be refined. In some embodiments, if the lead concentration in the electrolyte solution is above the holding capacity, greater amounts of lead will deposit onto the cathode creating a target material containing higher lead concentration than if the lead concentration in the electrolyte were below the holding capacity.

Thus, in some embodiments, there may exist an optimum lead concentration in the electrolyte solution that maximizes $^{210}$Pb removal yet does not exceed the electrolyte holding capacity.

In some embodiments, low alpha Pb is added directly to the tin material to be refined and the material or metal matrix is formed into the anode plate 210. For example, the tin material to be refined may be melted and the low alpha Pb may be mixed into the molten tin material to form a homogenous mixture. The tin and low alpha Pb mixture may be solidified and formed into the anode plate 210 for use with the electrorefining apparatus 200. Forming the anode plate 210 from a material containing a homogenous or substantially homogenous mixture of the tin material to be refined and the low alpha Pb may enable the lead in the anode plate 210 to disperse into the electrorefining solution 204 gradually. This gradual dispersion may allow a more even displacement of lead out of the electrorefining solution 204 in an insoluble form, and may prevent elevated lead deposition onto the cathode plate 208 during the electrorefining process that may occur when adding aqueous low alpha lead directly into the electrorefining solution 204.

EXAMPLES

The following non-limiting Examples illustrate various features and characteristics of the present invention, which is not to be construed as limited thereto.

Example 1

First Electrorefining Process

The isotope displacement refining process may use an electrorefining process to decrease alpha emissions in a target material. The electrorefining process used an electrolyte comprised of 21 L of 100 g/L stannous sulfate in 1.5 L of Technistan TP-5000 plating additive (Technic, Inc., Cranston, R.I.), 0.6 L of Technistan antioxidant (Technic, Inc., Cranston, R.I.), and 0.75 L of sulfuric acid. The anodes consisted of 99.95% tin with trace lead composition of 15 ppm.

The lead content of the starting electrolyte was determined to be 0.95 mg/L or 0.95 ppm. The starting lead concentration in the electrolyte was measured and is given in Table 3 below for each Crop ("Measured [Pb] ppm"). The amount of lead added to the electrolyte before each tin refining cycle is also given in Table 3 ("Pb added mg/L"). The alpha particle emissions (in counts/hour/cm$^2$) in the electrorefined material is shown in Table 3 as measured shortly after refining ("T0 Alpha") and after storage for at least 60 days ("T60 Alpha"). The number of days between the refining process and the T0 Alpha measurement is provided as "Actual T0 days" and the number of days between the refining process and the T60 Alpha measurement is provided as "Actual T60 days."

For a control sample to test the result when no lead is added, tin was electrorefined to achieve a cathode mass of 2 kg. The refined tin was melted, cast, and tested for lead content by inductively coupled plasma emission spectroscopy (ICP) and alpha emissivity in accordance with the procedure previously described in this disclosure. The results from this refining cycle are listed in the row labeled Crop 1 in Table 3 below.

To test the result when lead is added that is not low alpha Pb, 0.418 grams of Pb with alpha emissivity of 0.5 cts/cm$^2$/hr were dissolved in 25% nitric acid and added to the electrolyte solution. The lead content in the electrolyte was tested at 10.2 mg/L. Two cycles of tin electrorefining were performed, each generating approximately 2 kg of refined tin. The first cycle created Crop 2. Once Crop 2 was removed then Crop 3 was produced. The refined tin was melted, cast, and tested for Pb content by ICP and alpha emissivity in accordance with the procedure previously described in this disclosure. These results from these two cycles are listed in the rows labeled Crops 2 and 3 in Table 3 below.

To test the result of adding low alpha Pb to the tin, 0.84 grams of lead of alpha emissivity <0.002 cts/cm$^2$/hr was dissolved in 25% nitric acid and added to the electrolyte solution. The lead content in the electrolyte was tested at 4 mg/L. Two cycles of tin electrorefining were performed, each generating approximately 2 kg of refined tin. The first cycle created Crop 4. Once Crop 4 was removed then Crop 5 was produced. The refined tin was melted, cast, and tested for Pb content by ICP and alpha emissivity in accordance with the procedure previously described in this disclosure. These two cycles are listed as Crops 4 and 5 in Table 3 below.

To test the result of adding higher levels of low alpha Pb to the tin, 0.71 grams of lead of alpha emissivity <0.002 cts/cm$^2$/hr was dissolved in 25% nitric acid and added to the electrolyte solution. The lead content in the electrolyte was tested at 7.19 mg/L. Two cycles of tin electrorefining were performed, each generating approximately 2 kg of refined tin. The first cycle is listed as Crop 6 in Table 3. After Crop 6 was performed, the lead content in the electrolyte was tested at 3.3 mg/L. The second cycle is listed as Crop 7 in Table 3. The refined tin was melted, cast, and tested for Pb content by ICP and alpha emissivity in accordance with the procedure previously described in this disclosure.

As shown in Table 3, Crop 1, the alpha count for the control underwent a significant increase in alpha flux due to $^{210}$Pb/$^{210}$Po equilibrium. As observed in Crops 2 and 3, when lead that has a lower $^{210}$Pb content than the lead in the starting tin was added to the tin before separating it from the lead, the alpha count experiences some alpha drift from time T0 to T60, but the alpha drift is less than when no lead is added. However, if low alpha Pb is added before the tin undergoes a separation process, the alpha drift stays relatively constant from time T0 to T60, as observed in Crops 4 and 5.

Figure 3:
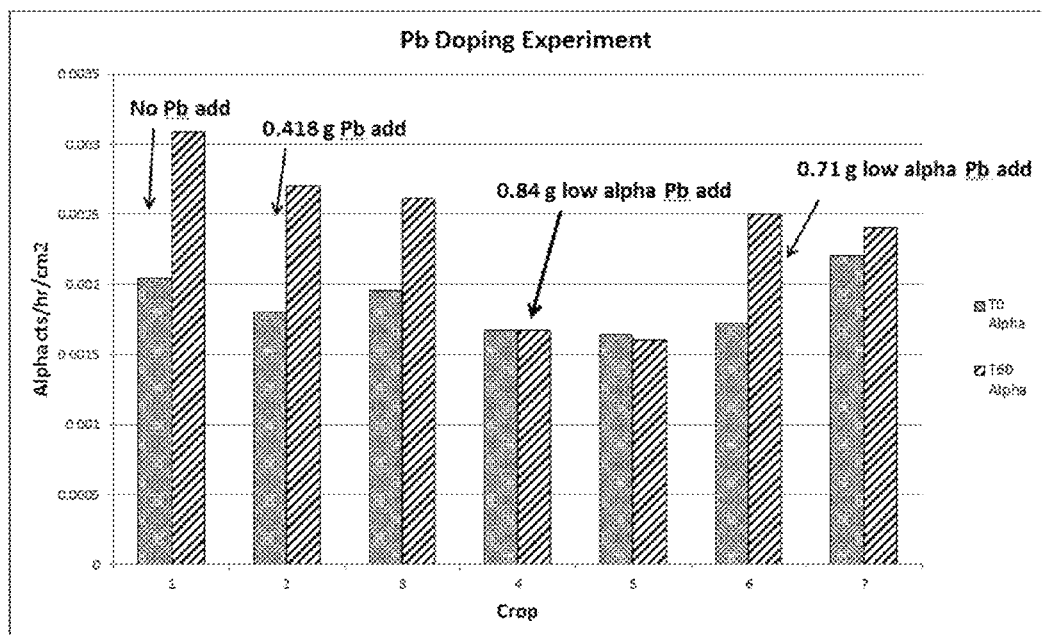

Comparing alpha emissions between Crop 3 which had lead that was not low alpha Pb added and Crop 5 which did have low alpha Pb added, it can be seen that placing low alpha Pb into the solution produces refined tin material with lower levels of alpha emissions than adding lead that that is not low alpha Pb. A plot of alpha particle flux for electrorefined tin samples at a time T0 after the refining process and at least 60 days after the refining process is shown in FIG. 3.

Lead saturation in the electrolyte solution may be responsible for the increased alpha drift in Crops 6 and 7. The increased alpha emissions of Crops 6 and 7 may be due, at least in part, to adding lead above the electrolyte holding capacity. If the lead concentration in the electrolyte when the electrorefining began is higher than the holding capacity, the refined tin may contain a greater lead concentration and therefore a greater $^{210}$Pb concentration. Thus, the data in Table 3 may demonstrate that an optimum lead concentration in the electrolyte solution exists between the starting concentrations used for Crops 4 and 5 and Crops 6 and 7.

TABLE 3

Data for Example 1-First Electrorefining Process

| Crop | Measured [Pb] ppm | Pb added (mg/L) | Cathode Pb(ppm) | T0 Alpha (cts/cm$^2$/hr) (±0.0004) | Actual T0 Days | T60 Alpha (cts/cm$^2$/hr) (±0.0004) | Actual T60 days |
|---|---|---|---|---|---|---|---|
| 1 | 0.68 | — | 10.0 | 0.00204 | 16 | 0.00309 | 63 |
| 2 | 10.20 | 14 | 320 | 0.00180 | 16 | 0.00270 | 61 |
| 3 | | — | 110 | 0.00195 | 16 | 0.00261 | 61 |
| 4 | 4.00 | 18 | 320 | 0.00167 | 15 | 0.00167 | 60 |
| 5 | | — | 130 | 0.00164 | 15 | 0.00160 | 60 |
| 6 | 7.19 | 23.7 | 340 | 0.00172 | 14 | 0.00250 | 72 |
| 7 | 3.30 | — | 300 | 0.00220 | 16 | 0.00240 | 54 |

Example 2

Second Electrorefining Process

The second electrorefining process used an electrolyte comprised of 21 L of 100 g/L stannous sulfate in 1.5 L of Technistan TP-5000 plating additive (Technic, Inc., Cranston, R.I.), 0.6 L of Technistan antioxidant (Technic, Inc., Cranston, RI), and 0.75 L of sulfuric acid. The anodes consisted of 99.99% tin with trace Pb composition of 7 ppm.

For a control sample to test the result when no lead is added, tin was electrorefined to achieve a cathode mass of 2 kg. The refined tin was melted, cast, and tested for lead content by ICP and alpha emissivity in accordance with the procedure previously described in this disclosure. The results from this refining cycle are listed in the row labeled Tank 1, Crops 1-5 in Table 4 below.

To test the result of adding low alpha Pb to the tin, 5.0012 g of lead of alpha emissivity less than 0.002 cts/cm$^2$/hr was dissolved in 25% nitric acid to make 1 L of solution. To test the result for adding 1× low alpha Pb, 6 mL of this 5 g/L lead solution were added to introduce 30 mg of lead alpha emissivity less than 0.002 cts/cm$^2$/hr into the electrolyte solution. Five cycles of tin electrorefining were performed, each generating approximately 2 kg of refined tin. The refined tin was melted, cast, and tested for Pb content by ICP and alpha emissivity in accordance with the procedure previously described in this disclosure. These five cycles are listed as Tank 2, Crops 1-5 in Table 4 below.

To test the result of adding 5× low alpha Pb to the tin, 30 mL of 5 g/L of lead of alpha emissivity less than 0.002 cts/cm$^2$/hr in 25% nitric acid were added to the electrolyte solution. That is, the samples included five times the amount of low alpha Pb than the 1× low alpha Pb samples. Five cycles of tin electrorefining were performed, each generating approximately 2 kg of refined tin. The refined tin was melted, cast, and tested for Pb content by ICP and alpha emissivity in accordance with the procedure previously described in this disclosure. These five cycles are listed as Tank 3, Crops 1-5 in Table 4 below.

To test the result of adding 10× low alpha Pb to the tin, 60 mL of 5 g/L of lead of alpha emissivity less than 0.002 cts/cm$^2$/hr in 25% nitric acid were added to the electrolyte solution. That is, the samples included ten times the amount of low alpha Pb than the 1× low alpha Pb samples. Five cycles of tin electrorefining were performed, each generating approximately 2 kg of refined tin. The refined tin was melted, cast, and will be tested for Pb content by ICP and alpha emissivity in accordance with the procedure previously described in this disclosure. These five cycles are listed as Tank 4, Crops 1-5 in Table 4 below. The amount of lead added to the electrolyte before each tin refining cycle is also given in Table 4 ("Pb added mg").

The $^{210}$Pb/Pb initial and $^{210}$Pb/Pb final data in Table 4 demonstrate that in all but two instances the concentration of $^{210}$Pb relative to total Pb decreased, and that, on average, the $^{210}$Pb/Pb decreased with increasing amount of low alpha lead added. The $^{210}$Pb concentration in the output also decreased relative to the input after crop 1 for each tank, indicating that the refining process successfully removed $^{210}$Pb.

TABLE 4

Data for Example 2-Second Electrorefining Process

| Tank | Crop | Pb mass added | Pb added (mg) | Cathode Pb (ppm) | $^{210}$Pb/Pb Initial (yg/g) | $^{210}$Pb/Pb Final (yg/g) | Initial $^{210}$Pb concentration (ag/g Sn) | Final $^{210}$Pb concentration (ag/g Sn) |
|---|---|---|---|---|---|---|---|---|
| 1 | 1 | Control-0 | 0 | 50 | 1.7 | 0.4 | 1.6 | 2.6 |
| 1 | 2 | Control-0 | 0 | 4 | 1.7 | 0.5 | 1.6 | 0.2 |
| 1 | 3 | Control-0 | 0 | 3 | 1.7 | 0.6 | 1.6 | 0.3 |
| 1 | 4 | Control-0 | 0 | 6 | 1.7 | 0.9 | 1.6 | 0.7 |
| 1 | 5 | Control-0 | 0 | 1 | 1.7 | 3.2 | 1.6 | 0.4 |
| 2 | 1 | 1x | 30 | 60 | 1.7 | 0.2 | 1.6 | 1.9 |
| 2 | 2 | 1x | 30 | 3 | 1.7 | 1.4 | 1.6 | 0.5 |
| 2 | 3 | 1x | 30 | 2 | 1.7 | 1.2 | 1.6 | 0.3 |
| 2 | 4 | 1x | 30 | 3 | 1.7 | 1.0 | 1.6 | 0.4 |
| 2 | 5 | 1x | 30 | 1 | 1.7 | 3.0 | 1.6 | 0.4 |
| 3 | 1 | 5x | 150 | 70 | 1.7 | 0.2 | 1.6 | 2.0 |
| 3 | 2 | 5x | 150 | 7 | 1.7 | 0.2 | 1.6 | 0.2 |
| 3 | 3 | 5x | 150 | 9 | 1.7 | 0.4 | 1.6 | 0.4 |

TABLE 4-continued

Data for Example 2-Second Electrorefining Process

| Tank | Crop | Pb mass added | Pb added (mg) | Cathode Pb (ppm) | $^{210}$Pb/Pb Initial (yg/g) | $^{210}$Pb/Pb Final (yg/g) | Initial $^{210}$Pb concentration (ag/g Sn) | Final $^{210}$Pb concentration (ag/g Sn) |
|---|---|---|---|---|---|---|---|---|
| 3 | 4 | 5x | 150 | 8 | 1.7 | 0.3 | 1.6 | 0.4 |
| 3 | 5 | 5x | 150 | 3 | 1.7 | 0.6 | 1.6 | 0.2 |
| 4 | 1 | 10x | 300 | 100 | 1.7 | 0.2 | 1.6 | 2.0 |
| 4 | 2 | 10x | 300 | 15 | 1.7 | 0.4 | 1.6 | 0.8 |
| 4 | 3 | 10x | 300 | 9 | 1.7 | 0.3 | 1.6 | 0.4 |
| 4 | 4 | 10x | 300 | 15 | 1.7 | 0.3 | 1.6 | 0.7 |
| 4 | 5 | 10x | 300 | 4 | 1.7 | 0.8 | 1.6 | 0.4 |

Example 3

Vacuum Distillation Refining Process

An Ajax Magnethermic vacuum induction melting furnace (VIM) (available from Ajax, Ontario, Canada) was used to separate lead from tin. The lid of the VIM featured a water cooled jacket, providing a suitable surface for vapor condensation.

Sample 1 was a control sample of tin to test the Pb separation from tin with no additional Pb added to the starting tin. For this control test, 1986.9 grams of 99.95% purity tin with a lead content of 19 ppm and $^{210}$Pb content of $3.3 \times 10^4$ atoms/g was added to the crucible. Thus, 37 mg of lead was in the starting material. The mixture was then melted and the VIM temperature was held at 1100° C. for 7.5 hours at a pressure of 20 Pa while the lead was allowed to separate out of the tin. The molten metal underwent significant stirring from the induction field during the separation process. After the separation process was complete, the mass of the refined tin was 1983.7 grams for a reduction of 3.2 grams. The lead content in the refined tin was measured by ICP at 1 ppm, or 2 mg.

Sample 2 was a used to compare to the control sample of Sample 1. For Sample 2, low alpha Pb was added to the tin sample before VIM separation. Sample 2 started with 1959.87 grams of the same 99.95% purity tin as Sample 1. The tin was placed in a graphite crucible in the VIM, and before the mixture was melted, 0.836 grams of less than 0.002 cts/cm²/hr Pb were added to the crucible. The tin and lead components were in excess of three years old relative any equilibrium disruption processes, so the $^{210}$Pb in both had reached equilibrium. The total lead concentration in the tin was 446 μg Pb/g Sn, or 446 ppm.

Following the refinement process, the final mass of the refined tin mixture was 1955.7 grams, which is a mass reduction of 5.006 grams. ICP analysis determined the final lead concentration in the tin ($Pb_{out}$) to be 3 ppm. Therefore, a total of 0.867 g of lead (442 ppm) was separated from the starting 1959.87 g tin mass. The values from both trials are listed in Table 5 as Samples 1 and 2.

The refined tin mass was rolled into a sheet suitable for alpha emissivity measurement. The initial T0 alpha emissivity in both the control and target tin were measured and observed to be at background levels.

Two additional sample pairings were created and tested before and after VIM refining. Similar to the pairing of Samples 1 and 2, the pairings of Sample 3 with Sample 4 and Sample 5 with Sample 6 are created using tin with the same starting $Pb_{in}$ concentration. In each pairing, the first sample (i.e., Samples 3 and 5) is used as a control with no lead added, and the other sample (i.e., Samples 4 and 6) has low alpha lead added before VIM separation. The same separation and testing procedure described above for Samples 1 and 2 was used for Samples 3-6 and the data is contained in Table 5 below.

The results for the control samples (i.e., Samples 1, 3, and 5) in Table 5 indicate that the vacuum distillation process successfully removed lead from the starting tin material and correspondingly reduced alpha flux in a tin mixture associated with $^{210}$Pb concentration. The doped samples (i.e., Samples 2, 4, and 6) all had higher bulk lead concentrations relative to the respective control samples, as is expected given the higher Pb concentrations in the inputs and the relative removal efficiency of the vacuum distillation process for Pb. However, the doped samples (i.e., Samples 2, 4, and 6) all exhibited a decrease in $^{210}$Pb$_{out}$ relative to the respective control samples (i.e., Samples 1, 3, and 5, respectively) even with the higher bulk lead values, demonstrating that $^{210}$Pb has been displaced in the output material. The consistently lower alpha activity in the doped samples versus the control samples indicates that the isotope displacement concept improves the performance of existing prior art processes in refining low alpha materials.

TABLE 5

Data for Example 3-Vacuum Distillation Refining Process

| Sample No. | Starting Sn mass (g) | $Pb_{in}$ (ppm) | $^{210}Pb_{in}$ (α units) | $^{210}Pb_{in}$ (ag/g Sn) | $Pb_{add}$(g) | Total Pb in sample (ppm) | $Pb_{out}$ (ppm) | Days | $^{210}Pb_{out}$ (α units) |
|---|---|---|---|---|---|---|---|---|---|
| 1 | 1986.9 | 19 | 0.016 | 1.3 | 0.000 | 19 | 1 | 52 | 0.0015 |
| 2 | 1959.9 | 19 | 0.016 | 1.3 | 0.836 | 446 | 3 | 52 | 0.000 |
| 3 | 1890.6 | 7 | 0.020 | 1.6 | 0.000 | 7 | 0.5 | 56 | 0.001 |
| 4 | 1977.7 | 7 | 0.020 | 1.6 | 0.793 | 408 | 4 | 49 | 0.0002 |

TABLE 5-continued

Data for Example 3-Vacuum Distillation Refining Process

| Sample No. | Starting Sn mass (g) | $Pb_{in}$ (ppm) | $^{210}Pb_{in}$ (α units) | $^{210}Pb_{in}$ (ag/g Sn) | $Pb_{add}$(g) | Total Pb in sample (ppm) | $Pb_{out}$ (ppm) | Days | $^{210}Pb_{out}$ (α units) |
|---|---|---|---|---|---|---|---|---|---|
| 5 | 553.1 | 14 | 0.354 | 28 | 0.000 | 14 | 0.5 | 59 | 0.0015 |
| 6 | 1291.4 | 14 | 0.354 | 28 | 0.510 | 409 | 1 | 58 | 0.0004 |

Where
$Pb_{out}$ is the total amount of lead remaining in the target material after refining,
$Pb_{in}$ is the total amount of lead in the material to be refined,
$^{210}Pb_{out}$ is the amount of $^{210}Pb$ in the target material after refining,
$^{210}Pb_{in}$ is the amount of $^{210}Pb$ in the material to be refined, and
$Pb_{add}$ is the amount of low alpha Pb added to dilute $^{210}Pb$.

TABLE 6

Data for Example 3-Vacuum Distillation Refining Process

| Sample No. | Starting Sn mass (g) | Low α Pb added (g) | Total Mixture Mass before VIM | Final Sn mass (g) | Total Mass Reduction in VIM |
|---|---|---|---|---|---|
| 1 | 1986.9 | 0 | 1986.9 | 1983.7 | 3.2 |
| 2 | 1959.9 | 0.836 | 1960.706 | 1955.7 | 5.006 |
| 3 | 1890.6 | 0 | 1890.6 | 1887.3 | 3.3 |
| 4 | 1977.7 | 0.793 | 1978.493 | 1974.3 | 4.193 |
| 5 | 553.1 | 0 | 553.1 | 550.3 | 2.8 |
| 6 | 1291.4 | 0.51 | 1291.91 | 1288 | 3.91 |

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A method for removing lead-210 ($^{210}Pb$) from a metal material, the method comprising:
   determining a $^{210}Pb$ concentration in a metal material to be refined;
   determining an amount of low alpha lead to be added to the metal material to be refined from the $^{210}Pb$ concentration, the low alpha lead having a $^{210}Pb$ concentration below that of the metal material to be refined;
   forming a doped metal mixture by adding the low alpha lead to the metal material to be refined;
   refining the doped metal mixture to separate at least a portion of the lead from the doped metal mixture to form a refined metal having a $^{210}Pb$ concentration lower than that of the metal material to be refined.

2. The method of claim 1, wherein the metal material to be refined comprises tin.

3. The method of claim 1, wherein the metal material to be refined includes at least one member selected from the group consisting of tin, lead, copper, aluminum, bismuth, silver, indium, antimony, selenium, gallium, thallium, zinc, and nickel, and alloys and combinations thereof.

4. The method of claim 1, wherein the refining step includes maintaining the doped metal mixture in a molten state within an atmosphere having a lower pressure than atmospheric and separating the lead in the doped metal mixture from the refined metal by a difference in the partial pressures of lead and the refined metal.

5. The method of claim 1, wherein refining includes electrorefining.

6. The method of claim 1, wherein the refined material has an alpha flux of 0.002 cts/cm²/hr or less after 800 days.

7. The method of claim 1, wherein the metal material to be refined has an alpha flux of 0.05 cts/cm²/hr or higher.

8. A method for removal of alpha particle emitters from a metal material having a first alpha emissions count, the method comprising:
   adding a lead material to the metal material, the lead material having a second alpha emissions count lower than the first alpha emissions count;
   refining the metal material to remove at least a portion of the lead with a refining process, wherein the refining process has selectivity of the metal material over lead.

9. The method of claim 8, wherein the metal material includes tin.

10. The method of claim 8, further including a second refining process for removal of at least one trace element other than lead.

11. The method of claim 8, wherein the metal material is selected from the group consisting of tin, lead, copper, aluminum, bismuth, silver, indium, antimony, selenium, gallium, thallium, zinc, and nickel, and alloys and combinations thereof.

12. The method of claim 8, wherein the refining step includes maintaining the metal material in a molten state within an atmosphere being substantially void of gaseous elements other than vapor of the metal mixture and removing the lead in the metal material from the metal material by a difference in the partial pressures of lead and the metal material.

13. The method of claim 8, wherein the refining process includes electrorefining.

14. The method of claim 8, wherein the refined material has an alpha flux of 0.002 cts/cm²/hr or less after 800 days.

15. The method of claim 8, wherein the metal material to be refined has an alpha flux of 0.05 cts/cm²/hr or higher.

16. A method of removing lead from a metal material, the method comprising:
   determining a concentration of a first lead isotope in a metal material to be refined, the metal material to be refined including the first lead isotope and a target metal;
   adding a lead material that is substantially free of the first lead isotope to the metal material to form a doped metal mixture; and
   removing at least a portion of the first lead isotope and the lead material from the doped metal mixture to form a refined target metal.

17. The method of claim 16, wherein the metal material is selected from the group consisting of tin, lead, copper, aluminum, bismuth, silver, indium, antimony, selenium, gallium, thallium, zinc, and nickel, and alloys and combinations thereof.

18. The method of claim 16, wherein the metal material to be refined has an alpha flux of 0.05 cts/cm$^2$/hr or higher.

19. The method of claim 16, wherein the target metal has an alpha flux of 0.002 cts/cm$^2$/hr or less after 800 days.

20. The method of claim 16, wherein the separating step includes maintaining the doped metal mixture at a molten state within a vacuum and the target material has a vapor pressure different than that of lead.

* * * * *